Sept. 25, 1951  H. L. BARTH  2,569,278
SLOT WEDGE FOR DYNAMOELECTRIC MACHINES
Filed Aug. 2, 1950
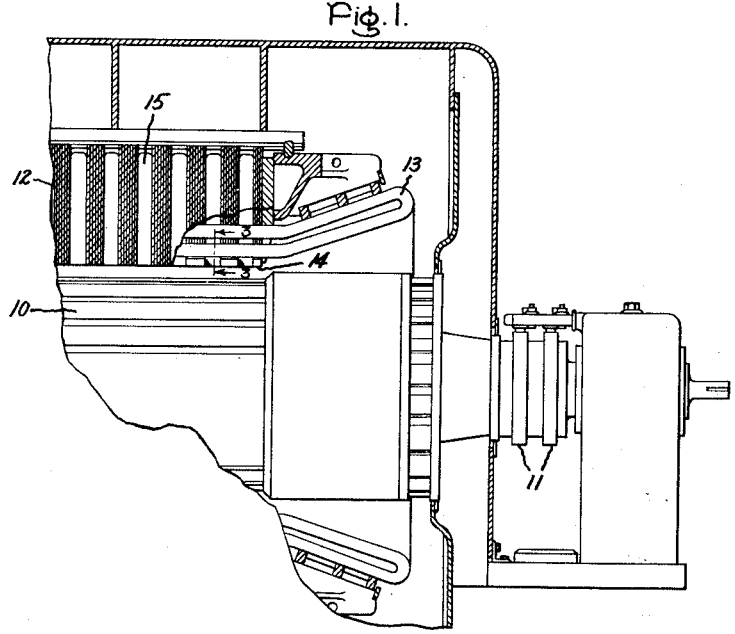
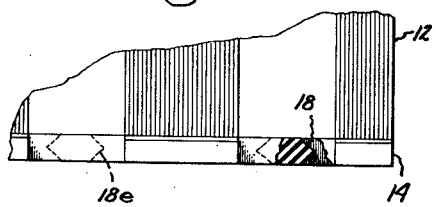
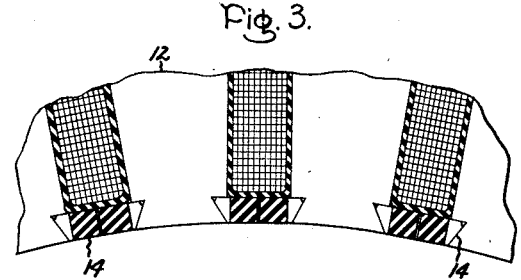
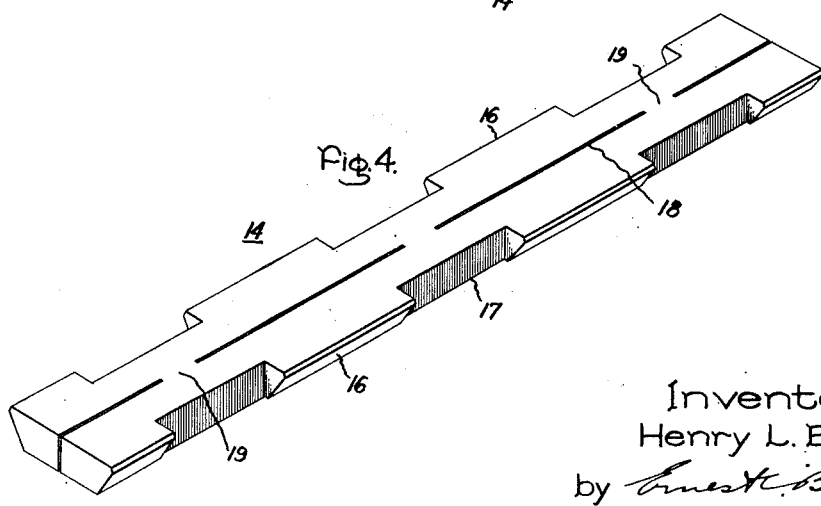
Inventor:
Henry L. Barth,
by Ernest H. Britton
His Attorney.

Patented Sept. 25, 1951

2,569,278

UNITED STATES PATENT OFFICE 2,569,278

SLOT WEDGE FOR DYNAMOELECTRIC MACHINES

Henry L. Barth, Scotia, N. Y., assignor to General Electric Company, a corporation of New York Application August 2, 1950, Serial No. 177,232

7 Claims. (Cl. 171—252)

1

My invention relates to slot wedges for a dynamoelectric machine or the like, and has particular significance in connection with a pressure wedge for retaining a winding element in a winding slot of a laminated core.

Conventionally dynamoelectric machine laminated cores provided with winding slots (such as a laminated stator core for a large turbine generator and provided with winding slots for the armature winding) are made by assembling already slotted punchings or laminations into a unitary assembly. Because of the requisite manufacturing and assembly tolerances, the slot edges presented by the various punchings do not line up perfectly. Thus when a winding element is subsequently put in the slot, and then a slot wedge is driven in to hold the winding in place, considerable difficulty is experienced in getting the wedge to be tight in the slot due to the fact that, in driving, the wedge material is sheared off on its sides by the rough edges presented by the punching edges in the slot, and when the wedge is driven to its final location, it is loose. The answer lies not merely in broaching or otherwise machining the inner surfaces of each slot to present a smooth surface, because such machining will lead to a short circuit of the laminations thereby providing hot spots during machine operation.

Heretofore it has been known to use wedges of wood (such as hard maple) or of other substantially non-resilient material with, however, the disadvantage that upon assembly the wedge surfaces are planed off, as above described, so that each wedge becomes loose, noisy, and apt to move when the machine is in operation, with movement of the wedge often tending to block off ventilating passages thus impeding the flow of ventilating medium for the machine. Furthermore, it has been conventional practice to attempt to wedge the wedges against each other, a plurality of short split or tapered wedges being used, but this entails a large number of pieces which are difficult to install and very often cannot be used over again when the machine is repaired.

It is an object of the present invention to provide simple and inexpensive means for overcoming the abovementioned difficulties.

A further object of the present invention is to provide for a dynamoelectric machine laminated and slotted core portion, a unitary slot wedge which will remain strong and tight after driving transverse to the lamination edges and which is heat resistant and substantially unshrinkable.

A still further object of the present invention

2 is to provide a dynamoelectric machine slot wedge of plastic material and having a mechanical design such that the slot wedge will be substantially impervious to small misalignment of adjacent punching edges, thereby to provide a slot wedge of improved mechanical design and of a chemical composition which makes allowance for high mechanical and thermal stresses.

Broadly the means employed in the embodiment herein illustrated and described comprises a molded resinous slot wedge having a plurality of longitudinally extending narrow slots extending through the depth of the wedge and longitudinally spaced apart to provide a plurality of bridges joining transversely opposite halves of the wedge, thereby to provide a resilient wedge which when gripped intermediate the bridges will be tight after assembly and of a material substantially impervious to the temperatures apt to be encountered during operation.

Further objects and advantages will become apparent and my invention will be better understood from consideration of the following description taken in connection with the accompanying drawing in which Fig. 1 is a partial sectional elevation of a dynamoelectric machine such as a turbine generator having a stator core portion provided with my improved slot wedge; Fig. 2 is an enlarged view of a portion of the stator core of Fig. 1 broken away to show the interior of the slot wedge; Fig. 3 is a cross sectional view taken on the line 3—3 of Fig. 1; and Fig. 4 is a perspective view of the slot wedge shown in Figs. 1, 2 and 3.

Referring now to Fig. 1, I have shown my invention in connection with a dynamoelectric machine having a rotor core portion 10 with a rotor winding (not shown) adapted to be energized through slip rings 11 in conventional manner to provide a rotating D. C. excited field arranged to electrodynamically cooperate with a laminated stator core portion comprising a plurality of axially separated stacks of laminations or punchings 12 provided with winding slots with an element of an armature winding 13 arranged in each winding slot and held in place therein by one or more dovetail slot wedges 14.

In machines of this type the stacks of stator punchings 12 are axially spaced to provide ventilating medium passages 15. The slot wedge of the invention is, as most clearly indicated in Fig. 4, provided with tapered or dovetail side faces 16 longitudinally interspaced by perpendicular or squared off portions 17 which (as most clearly indicated in Figs. 1 and 2) are (after the slot wedge has been driven into place) in substantial alignment with the interstack ducts 15 so that the tapered sides of the slot wedge will not cut down on the flow of cooling medium (conventionally air or hydrogen). The slot wedge (without the narrow grooves 18 which appear in the final product and are hereinafter described) may be conveniently made by molding a high strength organic plastic material such as one of the resin bound cloth laminates to the desired shape. The material should, in finished state, be somewhat resilient and I have found it desirable to use a molded resinous compound comprising a molded phenol formaldehyde resin binder with a cloth or rag filler. In order to obtain sufficient strength in the material it is preferable to employ long fiber filler such as, for example, chopped rags. The organic plastic binder may alternatively comprise, for example, organic plastics of the phenol-aldehyde, urea-aldehyde and melamine-aldehyde types. After molding, the solid slot wedge is provided with a plurality of longitudinally extending narrow grooves 18 extending through the thickness of the wedge and longitudinally spaced apart to form a plurality of bridges 19 joining transversely opposite halves of the wedge. In the drawing the thickness of the slots 18 is slightly exaggerated for clarity, for I have found the best results are obtained by using an extremely narrow slot, for example having a width of 15 mils or less, in order to limit the flexibility and prevent the slot from closing so much that the completed wedge will not fit tightly in the space provided for it. Those skilled in the art will recognize that it is impracticable to mold in, or even mill in, such a narrow slot, but I have found it possible to obtain a circular saw of narrow enough dimension to provide the proper slot by alternately sawing a groove in one side and then in the other as indicated by the arcuate slot ends 18e indicated in Fig. 2. If desired a plurality of longitudinally spaced wedges 14 may be used in each stator slot, each being used in turn to drive in the preceding wedge or wedges, so that finally a multiplicity of wedges is arranged end for end to fill the respective winding slot.

In operation the lengthwise grooves or kerfs extending clear through each wedge give it flexibility so that it may be assembled in laminated slots of varying dimensions without wearing off, thus resulting in a better assembled fit which will remain tight without support from adjacent wedges (as heretofore required by some types of "split" wedges). With the construction of the invention there are no disadvantages due to aging (as with glued parts). Furthermore a wedge of the material suggested herein will have greater resistance to heat than conventional wood wedges (which char at a relatively low temperature), and will not shrink after installation. With the constructions for which the wedge is intended, the plastic material is mainly in compression, very little shearing force is produced and the plastic will not fail due to shearing forces even though large forces are applied at the time that the individual wedges are pounded into the dovetail slots designed to accommodate them at the periphery of the winding slots.

While I have illustrated and described a particular embodiment of my invention, modifications thereof will occur to those skilled in the art. I desire it to be understood therefore that my invention is not to be limited to the particular arrangement disclosed and I intend in the appended claims to cover all modifications which do not depart from the true spirit and scope of my invention.

What I claim as new and desire to secure by Letters Patent of the United States is:

1. In combination with a dynamoelectric machine laminated core portion having winding slots and a winding in said slots, a plurality of molded resinous compound slot wedges arranged to hold said winding in said slots, each of said wedges having at least one narrow longitudinally extending slot extending through the thickness thereof and along a portion of the length thereof to form a pressure relief kerf, whereby planing of the sides of said slot wedge during insertion in the respective winding slot wedge receiving portion may be substantially minimized to allow a tight fit of said wedge in said wedge receiving portion.

2. An electric machine having a core portion comprising stacks of annular punchings with said stacks interspaced by radially extending ventilation ducts and said core having winding slots axially extending through said stacks and a winding arranged in said slots, means including a plurality of dovetail wedges fitting in dovetail receiving portions of said core slots through said stacks and adjacent said winding for holding said winding in place in said slots, each of said plurality of wedges comprising a molded resinous material, and each of said wedges having a plurality of longitudinally extending narrow kerfs extending through the depth of the respective wedge with said kerfs being longitudinally spaced apart to provide a plurality of bridges joining opposite halves of said wedge adjacent said ventilating medium ducts when each respective wedge is in place to hold the associated portion of the respective winding in said winding slot.

3. In a dynamoelectric machine having a stator core comprising stacks of annular punchings with said stacks axially interspaced by ventilation ducts and said punchings having winding slots adjacent the inner periphery thereof and axially extending through said stacks and a winding arranged in said slots, means for holding said winding portions in said slots comprising for each slot a plurality of dovetail wedges each fitting in a plurality of dovetail receiving portions of said core slots in said stacks adjacent said winding portions and having longitudinally spaced dovetailing tapered side faces which when said wedges are fully inserted are in substantial alignment with said dovetail receiving portions of said stacks, said wedges having interspaced between said tapered side faces axially interspaced straight side faces for enhancing ventilating medium flow between said stacks, each of said wedges having a plurality of longitudinally extending narrow grooves passing through the thickness of the respective wedge and longitudinally spaced apart to provide a plurality of bridges joining opposite halves of said wedge adjacent said straight side faces.

4. In combination with a dynamoelectric machine laminated core portion having winding slots and a winding in said slots, a plurality of slot wedges each comprising a somewhat resilient molded laminate of non-metallic sheet material formed from a filler and a binder, each of said wedges having at least one longitudinally extending slot having a width of less than twenty mils and extending through the depth of said wedge to form a pressure relief kerf, whereby due to the resilience of said material planing of the sides of said slot wedge during insertion in the respective winding slot of the laminated core portion may be substantially minimized to allow a tight fit of said wedge and winding in said slot.

5. In a dynamoelectric machine having a stator core comprising stacks of annular punchings with said stacks axially interspaced by ventilation ducts and said core having winding slots each having a winding receiving portion and a dovetail wedge receiving portion, a winding in said slots axially extending across said ducts and through said stacks, a plurality of dovetail wedges of phenolic resin bonded cloth filler molded compound with said wedges arranged end for end in each dovetail wedge receiving portion of each slot, and each of said wedges having a plurality of longitudinally spaced slots less than 20 mils in thickness and extending through the thickness of the respective wedge at least coextensive with the axial length of each stack when said wedges are fully inserted.

6. A slot wedge for an electric machine, said wedge comprising a high strength somewhat flexible molded material having axially spaced tapered dovetail side face portions and having longitudinally interspaced therebetween perpendicular side face portions, said wedge having a plurality of axially spaced axially extending narrow grooves cut through the thickness thereof substantially co-extensive with said tapered dovetail side face portions and forming axially interspaced bridge portions joining opposite halves of said wedge adjacent said perpendicular side face portions.

7. A slot wedge for a dynamoelectric machine or the like, said wedge comprising a molded resinous material and having at each of two opposite sides thereof a plurality of longitudinally spaced dovetailed tapered side face portions and longitudinally interspaced perpendicular squared off side face portions, said wedge having a plurality of longitudinally spaced longitudinally extending narrow grooves extending through the depth of said wedge and longitudinally extending co-extensive with said dovetail tapered side face portions to form bridges intermediate said grooves substantially co-extensive with said perpendicular squared off side face portions, whereby said wedge may be driven past slightly misaligned punching edges without planing off of said side face portions and with a resultant tight fit of slot wedge in its respective dynamoelectric machine slot.

HENRY L. BARTH.

REFERENCES CITED

The following references are of record in the file of this patent:

UNITED STATES PATENTS

| Number | Name | Date |
|---|---|---|
| 322,230 | Whitney | July 14, 1885 |
| 838,605 | Behrend | Dec. 18, 1906 |
| 888,456 | Barr | May 26, 1908 |
| 1,024,572 | Hellmund | Apr. 30, 1912 |
| 2,428,816 | Sigmund | Oct. 14, 1947 |